United States Patent [19]
Shafer

[11] Patent Number: 5,832,954
[45] Date of Patent: Nov. 10, 1998

[54] CHECK VALVE ASSEMBLY FOR INHIBITING HELMHOLTZ RESONANCE

[75] Inventor: Scott F. Shafer, Morton, Ill.

[73] Assignee: Caterpillar Inc., Peoria, Ill.

[21] Appl. No.: 263,293

[22] Filed: Jun. 21, 1994

[51] Int. Cl.$^6$ ................................................. F16K 15/08
[52] U.S. Cl. ............................... 137/543.15; 137/514.3; 137/513.3; 123/467
[58] Field of Search ................................ 137/513.3, 514, 137/514.3, 543.15; 123/467

[56] References Cited

U.S. PATENT DOCUMENTS

| | | | |
|---|---|---|---|
| Re. 33,270 | 7/1990 | Beck et al. ................................ | 123/447 |
| 794,209 | 7/1905 | Woodford ........................... | 137/543.15 |
| 1,561,175 | 11/1925 | Labus .............................. | 137/543.15 X |
| 2,289,946 | 7/1942 | Weatherhead, Jr. .............. | 137/543.15 X |
| 2,633,804 | 4/1953 | Bruce ............................... | 137/543.15 X |
| 3,213,878 | 10/1965 | Johnson .......................... | 137/543.15 X |
| 3,266,597 | 8/1966 | Söchting et al. ................ | 137/543.15 X |
| 3,395,725 | 8/1968 | Roach ............................. | 137/543.15 X |
| 3,845,784 | 11/1974 | Sullivan ......................... | 137/543.15 X |
| 4,172,465 | 10/1979 | Dasher ........................... | 137/543.15 X |
| 4,408,629 | 10/1983 | Lafont ............................ | 137/543.15 X |
| 4,456,029 | 6/1984 | McCrum ........................ | 137/543.15 X |
| 4,632,141 | 12/1986 | Post ................................ | 137/543.15 X |
| 4,823,552 | 4/1989 | Ezell et al. ................................ | 60/443 |
| 4,934,143 | 6/1990 | Ezell et al. ................................ | 60/443 |
| 5,168,855 | 12/1992 | Stone ..................................... | 123/446 |
| 5,191,867 | 3/1993 | Glassey ................................. | 123/446 |
| 5,213,083 | 5/1993 | Glassey ................................. | 123/447 |
| 5,245,970 | 9/1993 | Iwaszkiewicz et al. ............... | 123/447 |

FOREIGN PATENT DOCUMENTS

| | | | |
|---|---|---|---|
| 647808 | 12/1950 | United Kingdom ............. | 137/543.15 |

*Primary Examiner*—John Rivell
*Attorney, Agent, or Firm*—Dykema Gossett PLLC

[57] ABSTRACT

A check valve assembly is disposed in a flow path of a high pressure hydraulic actuating system between a source of pressurized fluid and a pressure responsive mechanism to limit flow to a single direction therebetween. A valve housing defines a fluid passage therethrough with a first axis therealong. The fluid passage has an annular first seat surface normal to the axis. A fitting is fixed to the valve housing and has a post directed toward fluid flow from the source of pressurized fluid. A check valve assembly slidably translates on the post between a closed position abutting the first seat surface which restricts flow toward the pressure source, and an open position spaced from the first seat surface which permits flow toward the pressure responsive mechanism. A spring disposed between the fitting and the check biases the check to the closed position.

3 Claims, 5 Drawing Sheets

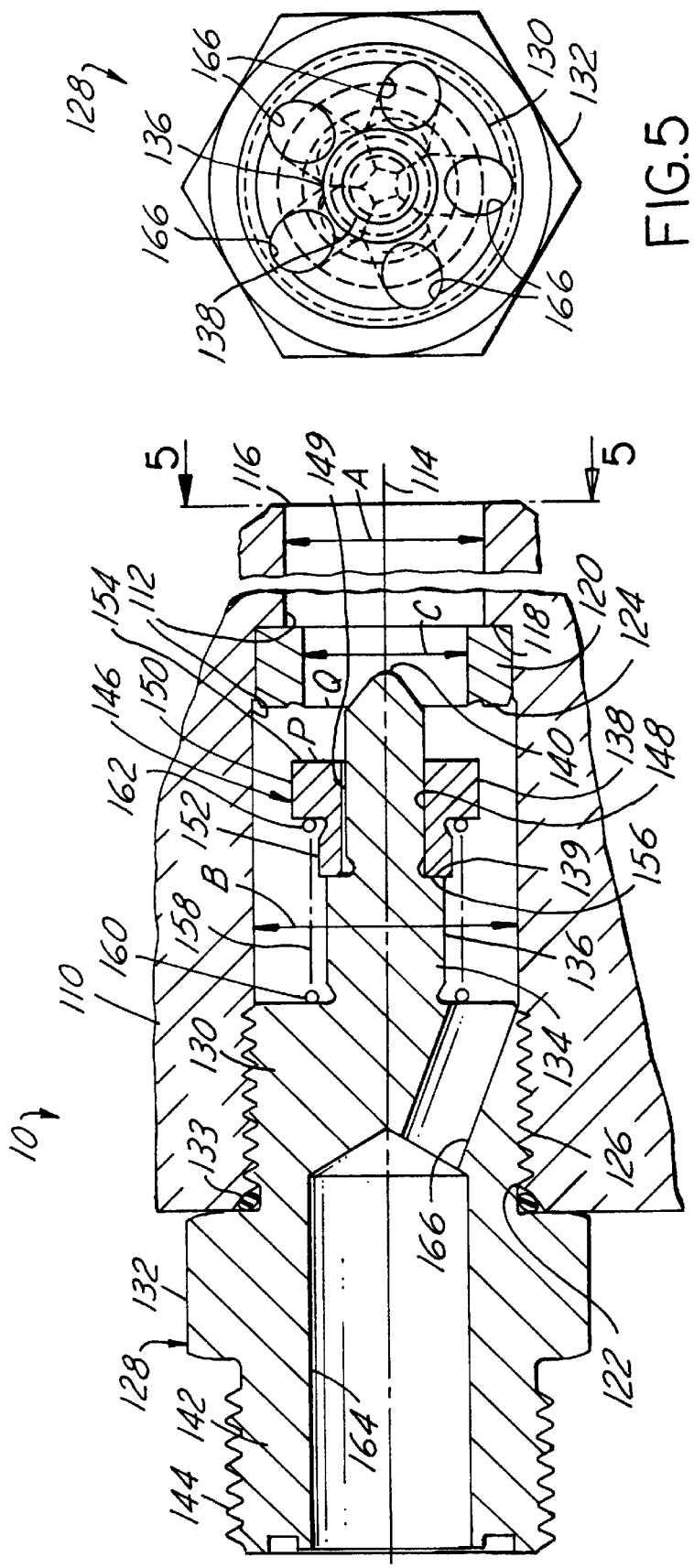

CHECK VALVE ASSEMBLY FOR INHIBITING HELMHOLTZ RESONANCE

TECHNICAL FIELD

The present invention relates generally to hydraulically actuated fuel injection systems for internal combustion engines and more particularly to check valve assemblies used in the hydraulically actuating portion of such fuel injection systems.

BACKGROUND OF THE INVENTION

Examples of hydraulically-actuated fuel injection systems are shown in U.S. Pat. No. 5,191,867 issued to Glassey, et al. on Mar. 9, 1993, and U.S. Pat. No. 5,213,083 issued to Glassey on May 25, 1993, both being assigned to the assignee of the present invention. Engines equipped with a hydraulically-actuated fuel injection system (HEUI fuel system) employ an actuating fluid pump to provide actuating fluid at elevated pressures to hydraulically-actuated injectors which typically intensify the pressure of the fuel being injected into the engine. Control of the fuel injection pressure is achieved by controlling the pressure of the actuating fluid.

For dual actuating fluid manifold systems, Helmholtz type check valves are used to prevent reverse flow from the manifolds, thereby preventing cross-talk between the manifolds and eliminating the possibility of inducing a resonant pulsing pressure within the manifolds. Such a pulsing pressure could prevent effective control of pressure within the manifolds. U.S. Pat. No. 5,168,855, issued to Stone on Dec. 8, 1992 and assigned to the assignee of the present invention teaches the use of check valve assemblies in HEUI fuel systems to control Helmholtz resonance. However, the valve assemblies employed have been found to be particularly difficult to integrate into certain commercially available actuating fluid pumps, particularly pumps manufactured by Vickers Incorporated. It would be desirable to provide valve assemblies easily integrated, or retrofit, into commercially available actuating fluid pumps such as those available from Vickers Incorporated.

The present invention is directed to overcoming the problem as set forth above.

DISCLOSURE OF THE INVENTION

In one aspect of the present invention a check valve assembly is disposed in a flow path of a high pressure hydraulic actuating system between a source of pressurized fluid and a pressure response mechanism. The check valve assembly effectively limits the fluid flow to a single direction from the source of pressurized fluid to the pressure responsive mechanism and comprises a valve housing which defines a fluid passage therethrough and a first axis therein. The fluid passage has an annular first seat surface normal to the first axis. The check valve assembly additionally comprises a fitting fixed to the valve housing at a first end of the fluid passage. The fitting has a post extending therefrom into the fluid passage with a tip directed toward fluid flow from the source of pressurized fluid. The fitting also has an opening which accommodates fluid flow therepast. The valve assembly further comprises a check with a second seat surface. The check is slidably disposed on the post for axial movement therealong between a closed position wherein the second seat surface abuts the first seat surface to restrict flow toward the pressure source, and an open position wherein the second seat surface is distal to the first seat surface permitting flow toward the pressure responsive mechanism. The check valve assembly yet further comprises a spring disposed between the fitting and the check and biasing the check to the closed position.

The present invention provides a check valve assembly which is both highly tolerant of production variations and offers superior durability.

BRIEF DESCRIPTION OF THE DRAWINGS

FIG. 4 is a diagrammatic partial cross-sectional view of one embodiment of a check valve assembly of FIG. 1.

FIG. 5 is a diagrammatic end view of a fitting of a check valve assembly in the direction of arrows 5 of FIG. 4.

BEST MODE FOR CARRYING OUT THE INVENTION

Figure 1:
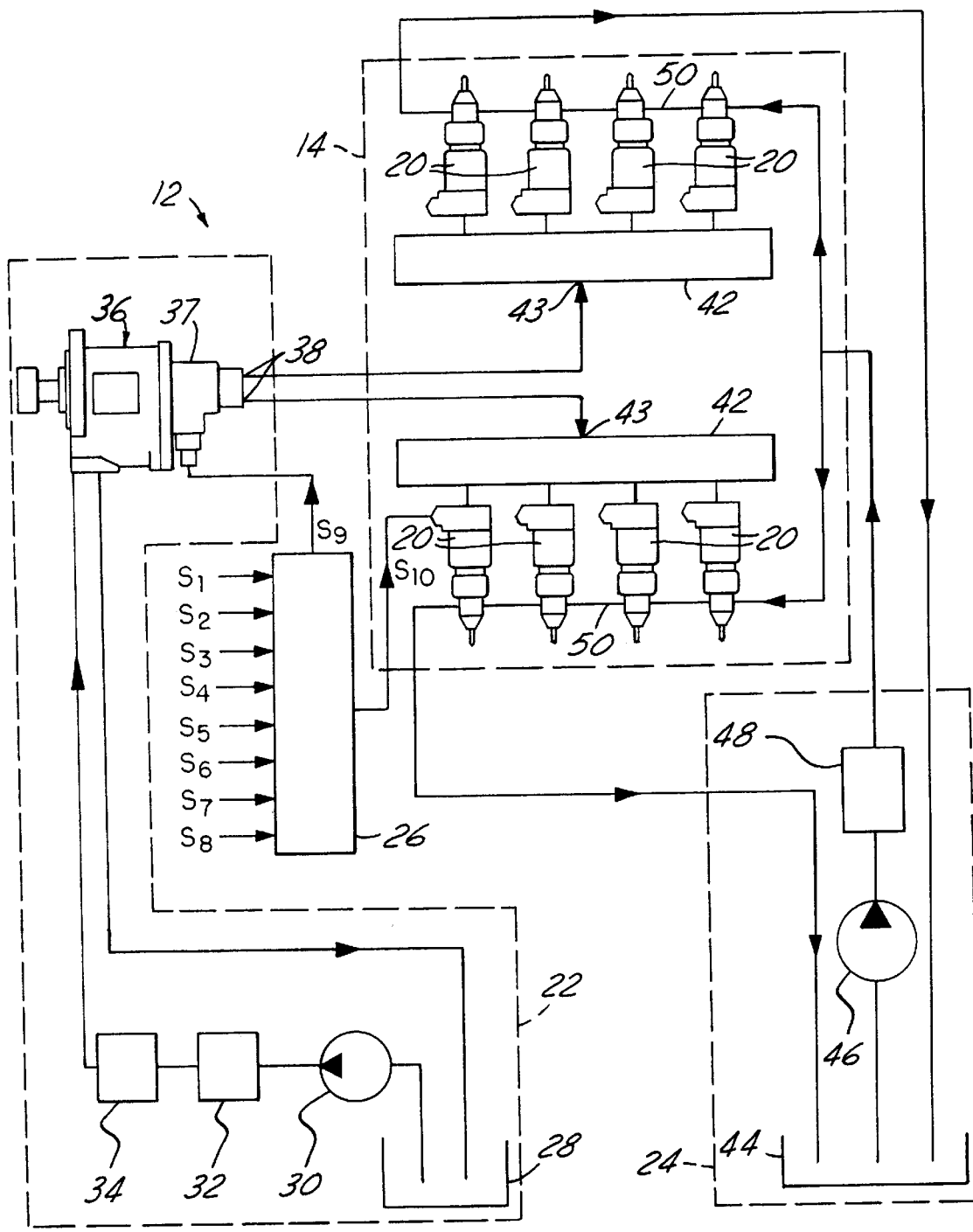
FIG. 1 is a diagrammatic general schematic view of a hydraulically-actuated electronically-controlled unit injector fuel system of the present invention, including both an actuating fluid circuit and a fuel supply circuit, for an internal combustion engine having a plurality of fuel injectors.

Referring to FIGS. 1 through 9, wherein the same reference numerals designate the same elements or features throughout all of FIGS. 1 through 9, a pair of check valve assemblies 10 are disposed in a hydraulically-actuated electronically-controlled injector system 12, hereinafter referred to as a HEUI fuel injection system. The check valve assemblies 10 are shown in FIG. 1 as being employed with a diesel-cycle direct-injection internal combustion engine 14. While a V-type 8-cylinder engine is illustrated in FIG. 1 and described herein, it should be understood that the invention is also applicable to other types of engines, and that the engines may have fewer or more than eight cylinders or combustion chambers. The exemplary engine 14, only partially shown in FIG. 2, has a pair of cylinder heads 16. Each cylinder head 16 has one or more unit injector bores 18 with four being provided here. The following description will first describe the elements and operation of the HEUI system 12 and then will describe in more detail specifics of the inventive embodiments of the check valves 10.

Figure 2:
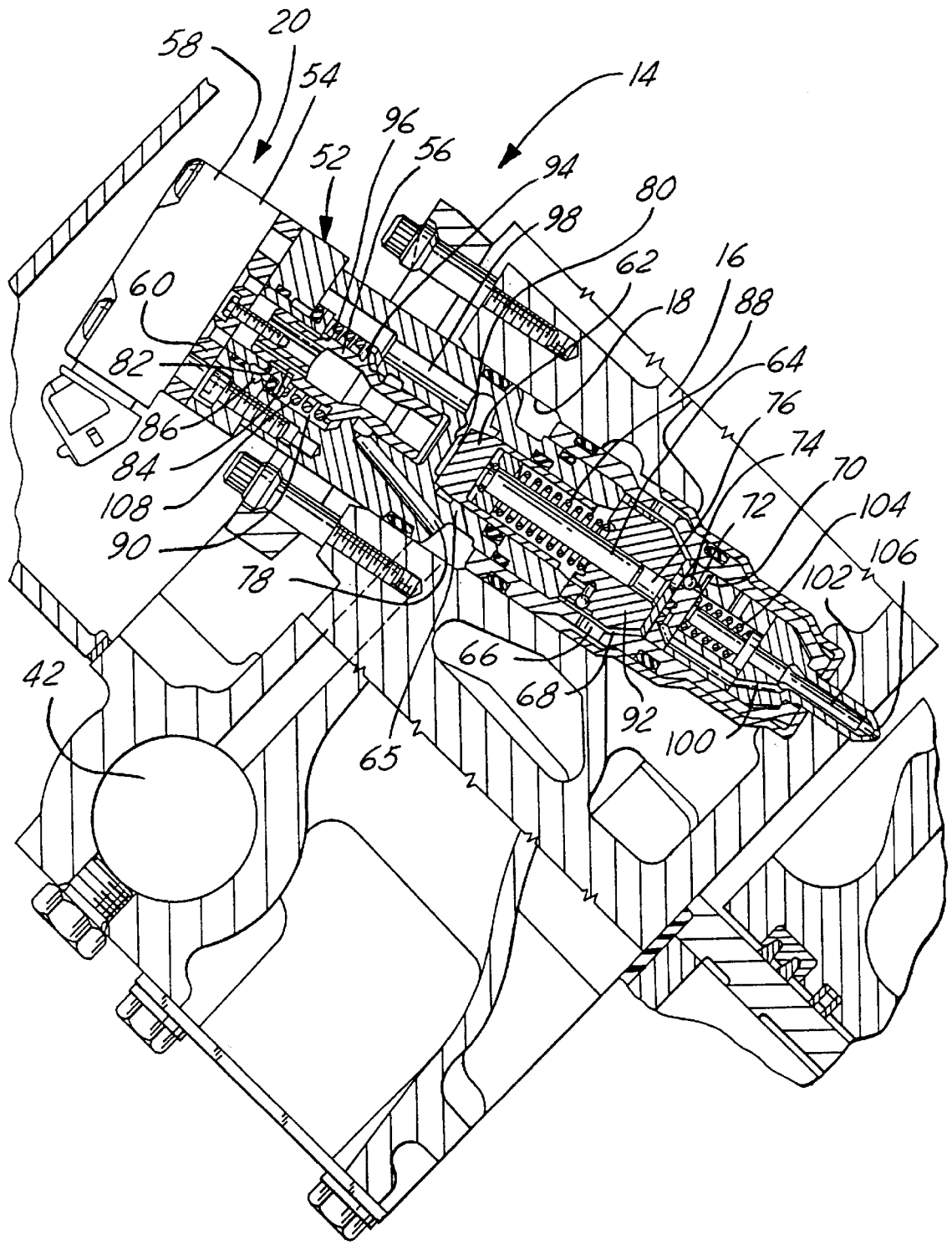
FIG. 2 is a diagrammatic partial cross-sectional view of one embodiment of a unit injector of FIG. 1 as installed in an exemplary internal combustion engine.

Referring to FIGS. 1 and 2, the HEUI fuel injection system 12 preferably includes one or more hydraulically-actuated electronically-controlled unit injectors 20 adapted to be positioned in a respective unit injector bore 18, means or device 22 for supplying hydraulic actuating fluid and damping fluid to each unit injector 20, means or device 24 for supplying fuel to each unit injector 20, and means or device 26 for electronically controlling the HEUI fuel system 12 such as an electronic control module 26. While unit injectors 20 are preferred in this embodiment, other applications might be better served by non-unitized fuel injectors.

The means or device 22 for supplying hydraulic actuating fluid to each unit injector 20 includes a sump 28 from which fluid is drawn by a low pressure transfer pump 30. The device 22 also includes the pump 30, a cooler 32, a filter 34 and a high pressure pump 36 with an integrated pressure control system, with hydraulic actuating fluid being transferred sequentially therebetween. The high pressure pump 36 varies an output pressure of fluid from an output port 38 of the high pressure pump 36 in response to a signal S9 from the ECM 26. The signal S9 from the ECM 26 is determined as a function of one or more input signals S1 through S8 indicative of a plurality of system parameters.

Figure 3:
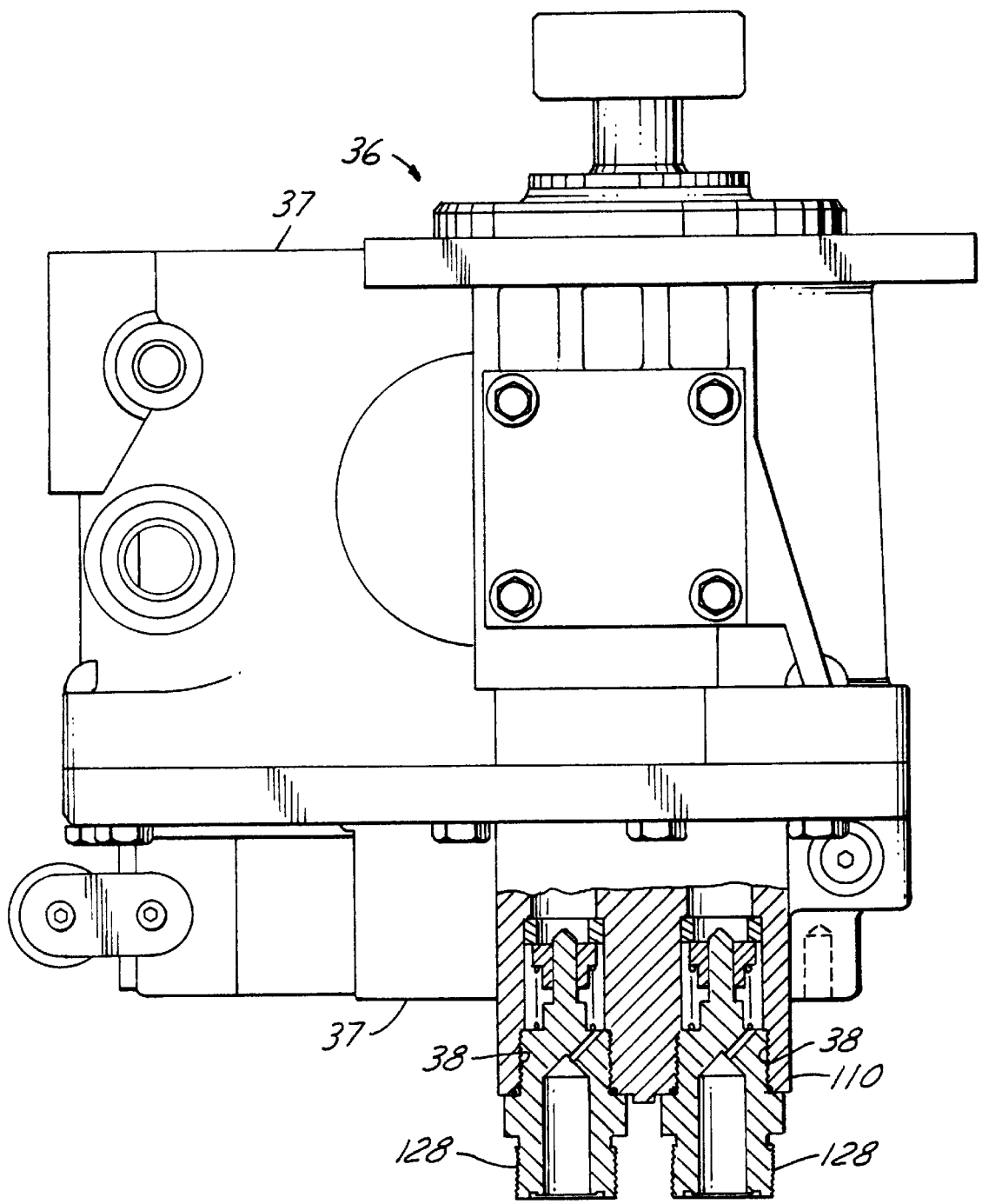
FIG. 3 is a diagrammatic partially cross-sectional view of one embodiment of a high pressure pump.

Referring to FIG. 3, the check valve assembly 10 is preferably located in each outlet passage 38 or port defined in a housing 37 of the actuating fluid pump 36. In the embodiment shown, the pump 36 includes a pair of outlet passages 38, each one communicating with a respective manifold 42. Each check valve assembly 10 is threadably connected to the respective outlet passage 38. Alternatively, each check valve assembly 10 may be located anywhere in the fluid path between each pump outlet passage 30 and a respective entrance 43 to each actuating fluid manifold 42, inclusive. A more detailed illustration of a first embodiment of one of the check valve assemblies is shown in FIGS. 4 and 5.

The check valve assemblies 10 allow fluid to pass from the output ports 38 and into the respective manifolds 42, but restrict fluid flow back from the manifolds 42 to the output ports 38. The check valve assemblies 10 also serve to minimize fluid communication between the two manifolds 42. Hydraulic actuating fluid within the manifold 42 enters the fuel unit injectors 20.

The means or device 24 for supplying fuel includes a fuel tank 44 and a transfer pump 46 removing fluid therefrom and passing it through a conditioning means 48, also part of the fuel supplying device 24. Fuel passes from the conditioning means 48 into fuel manifolds 50 and to the respective banks of unit injectors 20. Fuel is supplied to the fuel manifolds 50 and injectors 20 at a relatively low pressure (for example, about 276 to 413 kPa or 40 to 60 psi).

An actuator and valve assembly 52 of each unit injector 20 is provided as a means or device for selectively communicating either relatively high pressure actuating fluid or relatively low pressure damping fluid to each unit injector 20 in response to receiving an electronic fuel delivery command signal S10 shown in FIG. 1. As shown in FIG. 2, the actuator and valve assembly 52 includes an actuator 54, preferably in the form of a solenoid assembly 54, and a valve 56, preferably in the form of a poppet valve 56.

The solenoid assembly 54 includes a fixed stator assembly 58 and a movable armature 60. The unit injector 20 also has an intensifier piston 62 and an associated fuel pumping plunger 64 which may be either a separate component or integral with the piston 62. The piston 62 is slidably disposed in a valve body 65. Actuating fluid manifolds 42 connect the unit injectors to the hydraulic fluid pressure control system 10. Fuel rails or manifolds 50 connect the unit injectors 20 with the device for supplying fuel 24. The electronic control module 26 receives input data signals from one or more signal indicating devices, for example eight signal indicating devices providing signals S1 through S8. Input data signals may include engine speed S1, engine crankshaft position S2, engine coolant temperature S3, engine exhaust back pressure S4, air intake manifold pressure S5, hydraulic actuating fluid manifold pressure S6, throttle position or desired fuel setting S7 and transmission operating condition indicative signal S8 which, for example, may indicate the gear setting of the transmission. The output control signal S9 is the actuating fluid manifold pressure command signal directed to the high pressure pump 36 which is an element of the device 22 for supplying hydraulic fluid.

The HEUI system operates in the following manner. Referring to FIG. 2, the low pressure fuel from the fuel manifold 50 flows through case fuel inlet holes 66, an annular passage 68, a close-clearance passage 70 such as an edge filter, and then an inlet passage 72. The relatively low pressure fuel unseats a check valve 74 when the pressure in the fuel pump chamber 76 is lower than the pressure upstream of the check valve 74. While the check valve 74 is unseated, the fuel pump chamber 76 is refilled with fuel.

While the solenoid assembly 54 is in its de-energized state, the poppet valve 56 is at a first blocking position, blocking fluid communication between an actuating fluid inlet passage 78 and a piston pump chamber 80 while opening communication between the piston pump chamber 80 and an upper annular peripheral groove 82, passage 84, and a drain passage 86 that communicate with an actuating fluid sump 28 such as an engine oil pan. With negligible fluid pressure in the piston pump chamber 80, a plunger spring 88 pushes upwardly against the plunger 64 and intensifier piston 62 seating the piston against a valve body 65.

The HEUI system allows at least one injection start point, at least one injection stop point, and the injection pressure to all be regulated independent of engine speed and load. The quantity of fuel delivered can consequently be varied independent of engine speed and load.

In order to start injection, a fuel delivery command signal S10 is emitted by the electronic control module 26 and delivered to an electronic drive unit (not shown). The electronic drive unit generates a preselected wave form to the solenoid assembly 54 of a selected unit injector 20. The solenoid assembly 54 is electrically energized so that the armature 60 is magnetically drawn towards the stator 58. The poppet valve 56 is also pulled by the moving armature 60. The poppet valve 56 moves to an inject position where a lower seat 94 of the poppet valve 56 provides fluid communication between the inlet passage 78 and the piston pump chamber 80 while an upper seat 96 blocks fluid communication between the piston pump chamber 80 and the drain passage 86. Hydraulic actuating fluid at a relatively high pressure (for example, about 23 MPa kPa or 3,335 psi) flows through the inlet passage 78, the annular chamber 90, intermediate passage 98 and piston pump chamber 80 and thereby hydraulically exerts a driving force on the intensifier piston 62.

The high pressure actuating fluid displaces the intensifier piston 62 and plunger 64 in opposition to the force generated by the compressed plunger spring 88 and fuel pressure. The fuel in the fuel pump chamber 76 is pressurized to a level which is a function of the pressure of the actuating fluid in the intensifier piston pump chamber 80 and the ratio of effective areas A1/A2 between the intensifier piston 62 and the plunger 64. This pressurized fuel flows from the fuel pump chamber 76 and through a discharge passage 100 where it acts on a needle check 102 in opposition to a force exerted by a needle check spring 104. The pressurized fuel lifts the needle check 102 after a selected pressure level is reached and the highly pressurized fuel is injected through injection spray orifices 106.

In order to end injection, or control the quantity of fuel injected independent of engine speed and load, the electronic control module 26 discontinues its fuel delivery command signal S10 to the electronic drive unit. The electronic drive unit then discontinues its waveform thereby electrically de-energizing the solenoid assembly 54 of the selected unit injector 20. The absence of the magnetic force allows the compressed poppet spring 108 to expand causing both the armature 60 and poppet valve 56 to move back to their closed position.

The check valve assemblies 10 have a housing 110 defining a fluid passage 112 therein as shown in FIG. 4. The valve housing 110 could be common for both check valves 10, or separate housings 110 could be provided for each valve 10. Preferably, the housing 110 is integrated into and unitary with the housing 37 of the pump 36 at its outlet portion as illustrated in FIG. 3. Alternatively, the housing 110 may be integrated into the cylinder head 16 downstream of the pump 36. The fluid passage 112 within the valve housing 110 defines a first axis 114 therealong and enters the housing 110 at a first end 116 of the passage 112. A first diameter A of the passage 112 extends through the housing 110 from the first end 116 to a shoulder 118 within the fluid passage 112 which defines a transition from the first diameter A of the fluid passage 112 to a larger second diameter B.

An annularly shaped hardened seat 120 is pressed into the housing 110 from a second end 122 of the passage 112, up against the shoulder 118. The hardened seat 120 has an inside diameter C and a flat first seat surface 124 which faces the second end 122 of the passage 112 and is normal to the axis 114. The second end 122 of the passage 112 also has threads 126 therein. Alternatively, the shoulder 118 is hardened, eliminating the need for the seat 120.

A fitting 128 has a threaded first shank 130 engaging the threads 126 of the valve housing 110. A port seal 133, shown here as an O-ring, is disposed between the valve housing 110 and the fitting 128. A shoulder portion 132 of the fitting 128 limits travel of the fitting 128 into the valve housing 110. The port seal 133 is compressed between the shoulder portion 132 and the housing 110. An elongated post 134, having a base portion 136 smaller in diameter than the first diameter A of the fluid passage 112 and a guide portion 138 smaller in diameter than the inside diameter C of the hardened seat 120, extends from the first shank 130 into the passage 112. A transition from the base portion 136 to the guide portion 138 is defined by a shoulder 139 of the base portion 136. The shoulder is normal to the axis. A tip 140 on an end of the guide portion 136 is disposed within the hardened seat 120. A second shank 142 extends from the shoulder portion 132 opposite the first shank 130 and the post 134. The second shank 142 has threads 144 for engaging a fluid fitting (not shown), but could alternatively employ a quick connect fitting in place of the threads 144.

A check 146 is slidably disposed on the guide portion 138 of the post for movement parallel to the axis 114. In the first embodiment, shown in FIG. 4, the check 146 has a constant inside diameter bore 148 providing the desired sliding relationship with the guide post 138. A selected diametral clearance 149 is defined between the guide portion 138 and the movable check 146 of each check valve assembly 10. An outside diameter of the check is stepped from a first diameter section 150, where the outside diameter is greater than diameter C but less than diameter B, to a smaller second diameter section 152, giving the check 146 the appearance of a top hat. The first diameter section 150 has a flat second seat surface 154 disposed toward and parallel to the first seat surface 124 of the hardened seat 120. The check 146 operably moves between an open position P where an end surface 156 of the check 146 opposite the second seat surface 154 abuts the shoulder 139 of the base portion 136, and a closed position Q where the second seat surface 154 seats against the first seat surface 124 of the hardened seat 120.

The sealing provided by the second seat surface 154 pressing against the parallel first seat surface 124 is highly tolerant of variations in the location of the check 146 relative to the hardened seat 120 because of the large amount of radial overlap between the two surfaces 124 and 154. Additionally, the parallel surfaces 124 and 154 provide a relatively large amount of reaction area, thereby minimizing the unit area loading on the valve surfaces 124 and 154. The guidance provided by the guide portion 138 of the post 134 maintains the second seat surface 154 of the check 146 in a parallel relationship with the first seat surface 124 of the hardened seat 120, ensuring there will be no point loading therebetween to further ensure minimized unit area loading.

A similar relationship exists between the end 156 of the check 146 opposite the second surface 154 and shoulder 139 of the base portion 136, minimizing unit area loading therebetween. Both surfaces 156 and 139 are flat and parallel to each other.

To provide the desired durability of the check valve assembly 10, the fitting 128 and the check 146 are preferably both hardened to Rockwell 59 C minimum. The seat 120 is also preferably hardened to Rockwell 59 C minimum for durability reasons. Translation of the check 146 along the axis 114 is aided by the coaxial fit between the check 146 and the guide portion 138 which serves to greatly enhance durability.

A compression spring 158 is disposed between the check 146 and the fitting 128, biasing the check 146 to the closed position Q. A first end 160 of the spring presses against the first shank 130 of the fitting 128. A second end 162 of the spring 158 is disposed over the second diameter 152 section of the check, engaging the first diameter portion 150 of the check 146.

The fitting 128 has a central bore 164 beginning at an end of the second shank 144 to a point within the first shank 130. The central bore 164 has a diameter approximately equal to diameter C of the hardened seat 120. A plurality of ports 166, five in the embodiment of FIGS. 3 and 4, are distributed around the post 134, passing through the first shank 130 to provide fluid communication between the fluid passage 112 of the housing 110 and the central bore 164, with total flow areas of the ports 166 preferably being approximately equal to the flow area of diameter C.

In an alternative embodiment of the invention shown in FIGS. 5 through 8, a snubbing check 168 has a single outside diameter D and first and second bores 169 and 170 respectively, with corresponding first and second inside diameters E and F. The outside diameter D is larger than diameter C and smaller than diameter B. The snubbing check 168 has a first end surface 171 parallel to and disposed toward the first seating surface 124. The snubbing check 168 also has a second end surface 172 disposed toward the first shank 130 which the spring 158 presses against. The first inside diameter E extends from the first end surface 171 toward the second end surface 172. Diameter E is sized to provide a coaxial sliding arrangement with the guide portion 138 of the post 134. At a point between the first and second end surfaces 171 and 172, there is a reaction surface 174 of the check 168 normal to the axis 114 defined by a transition from diameter E to larger diameter F. Diameter F is sized to provide a close fitting clearance relationship with respect to the base portion of the post 136. The reaction surface 174 presses against the shoulder 139 of the base portion 136 when the snubbing check 168 is in the open position P. The fitting 128 shown in FIGS. 5–8 has four ports 166 instead of five. A cool down orifice 176 in the check 168 passes from a first end surface 171 within seat diameter C to a side of the check. The orifice 176 serves the same function as the diametral clearance 149 for check 146.

Figure 6:
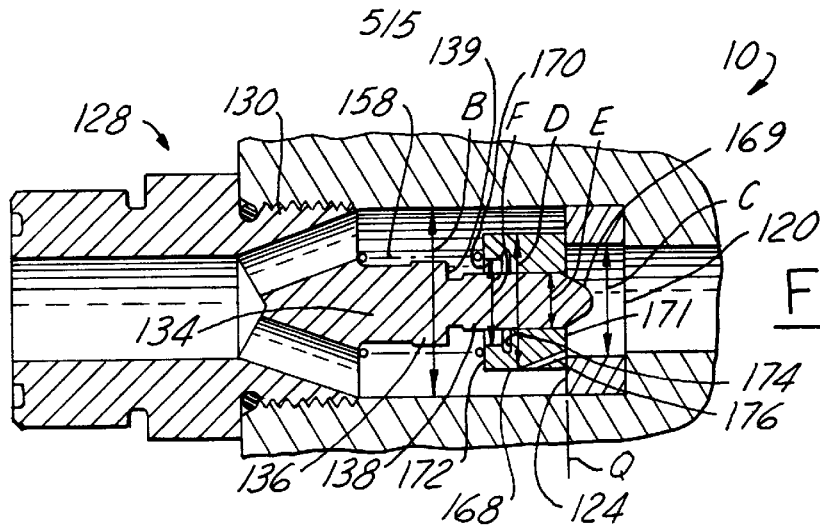
FIG. 6 is a diagrammatic partial cross-sectional view of a second embodiment of the check valve assembly of FIG. 1 in a closed position.
Figure 7:
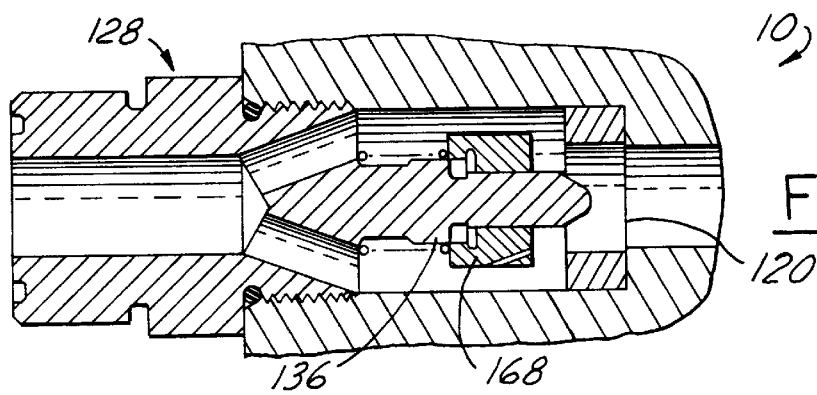
FIG. 7 is a diagrammatic partial cross-sectional view of the second embodiment of the check valve assembly of FIG. 1 in a partially open position.

The reaction surfaces within the valve as shown in FIGS. 5–7 are similarly configured to minimize unit loading.
Industrial Applicability In the first embodiment shown in FIGS. 3–4, hydraulic actuating fluid passing from the output port 38 of the high pressure pump 36 to the hydraulic actuating fluid manifold 42 displaces the check 146 along the guide portion 138 of the post 134 against the base portion 136, compressing the spring 158. Fluid flows through the housing passage 112, past the check 146 and through the ports 166. The fluid passes into the central bore 164 of the fitting 128 and on into the hydraulic actuating fluid manifold 42.

When there is a halt or reversal of the fluid flow, the spring 158 forces the check 146 against the hardened seat 120. With the first and second seating surfaces 124 and 154 being pressed against each by force from the spring 158 as well as pressure from the hydraulic actuating fluid, flow reversal toward the output port 38 is effectively restricted to that which passes through the diametral clearance 149.

After the engine has been shut off, the remaining actuating fluid in each manifold 42 cools off and naturally contracts in volume. The diametral clearance 149 provides a restricted flow path which helps replenish or refill the respective manifold 42 with hydraulic actuating fluid when the pump 36 is not operating. In this way, each manifold 42 is primed or substantially refilled with actuating fluid for easier start up of the engine. Making up means serving a similar function are described in U.S. Pat. No. 4,168,855, col. 16, lines 44–63.

Figure 8:
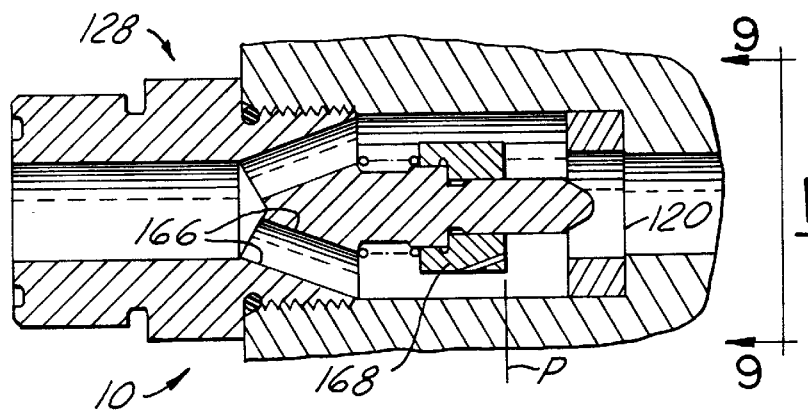
FIG. 8 is a diagrammatic partial cross-sectional view of the second embodiment of the check valve assembly of FIG. 1 in a fully open position.
Figure 9:
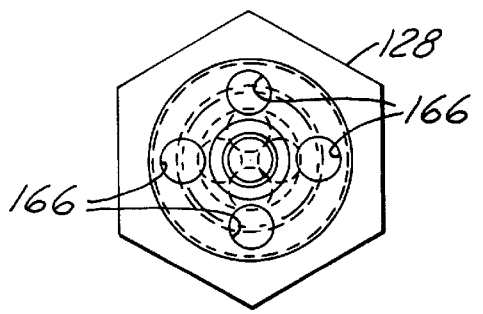
FIG. 9 is an end view of a fitting of FIGS. 6 through 8 shown in the direction of arrows 9 of FIG. 8.

The snubbing check 168 of the alternative embodiment, shown in FIGS. 5–8, is similarly moved in response to flow changes through the valve assembly 10, but has the additional characteristic of being snubbed or damped as it approaches the base portion 136 of the post 134. Fluid trapped between the shoulder 139 of the base portion 136 and the reaction surface 174 of the snubbing check 168 as shown in FIG. 6 must be forced out between the two parts before the snubbing check 168 can be fully seated as shown in FIG. 8. This snubbing action decelerates the check prior to reaching full open position and further reduces the seating impact forces between the check 168 and the post 134 as the check 168 is seating thereagainst.

The valve assemblies 10 of the present invention are highly durable, as the parallel contacting surfaces of the check 146, 168 and the seat 120 provide a relatively large amount of reaction area, thereby minimizing the unit area loading of the surfaces. Because the contacting surfaces are parallel, and the surfaces seat against each other and not within each other, axial alignment between the check 146, 168 and the seat 120 can vary significantly with no effect on the function of the valve assembly 10. Additionally, the reaction area is sufficiently large that significant variations in the outer diameter of the check and diameter C of the seat can be tolerated without appreciably affecting the unit area loading of the valve assembly 10.

Other aspects, objects and advantages of this invention can be obtained from a study of the drawings, the disclosure and the appended claims.

I claim:

1. A check valve assembly adapted to be disposed in a flow path of a high pressure hydraulic actuating system between the source of pressurized fluid and a pressure responsive mechanism and effectively limiting fluid flow to a single direction from the source of pressurized fluid to the pressure responsive mechanism, comprising:

a valve housing defining a fluid passage therethrough in turn defining a first axis therealong and having an annular first seat surface oriented approximately normal to the first axis;

a fitting fixed to the valve housing at a first end of the fluid passage and having a post fixed thereto approximately parallel to the axis with a tip directed toward fluid flow from a source of pressurized fluid and having a blind bore open on an end of the fitting opposite the valve housing and a plurality of ports disposed around the post and passing into the bore thereby fluidly connecting the fluid passage with the bore and accommodating fluid flow therepast;

a check having a second seat surface and being slidably disposed on the post for axial movement therealong between a closed position wherein the second seat surface abuts the first seat surface to restrict flow toward the pressure source and an open position wherein the second seat surface is distal to the first seat surface permitting flow toward a pressure responsive mechanism; and means for biasing the check to the closed position.

2. The check valve assembly of claim 1, wherein the post has a base portion and a smaller diameter guide portion extending therefrom with the tip at an end thereof and with a shoulder normal to the axis defining a transition from the base portion to the guide portion.

3. The check valve assembly of claim 2, wherein the check has a first inside diameter providing a guiding relationship with respect to the guide portion of the post and a second inside diameter providing a clearance relationship with the base portion of the post wherein as the check moves to the closed position, fluid trapped between the check and the shoulder of the post resists movement of the check to the open position.

* * * * *